Jan. 20, 1959  W. P. MASON  2,870,241
METAL CONNECTION

Filed Jan. 20, 1954  4 Sheets-Sheet 1

INVENTOR
W. P. MASON
BY Hugh S. Weitz
ATTORNEY

Jan. 20, 1959 W. P. MASON 2,870,241
METAL CONNECTION
Filed Jan. 20, 1954 4 Sheets-Sheet 2
FIG. 7A
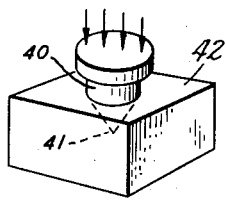
FIG. 8A
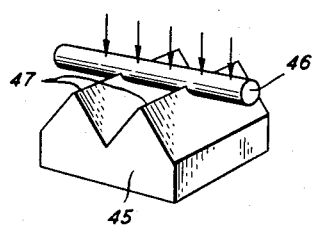
FIG. 9A
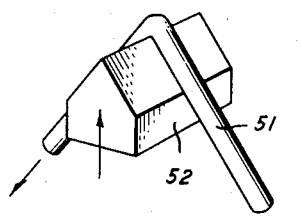
FIG. 7B
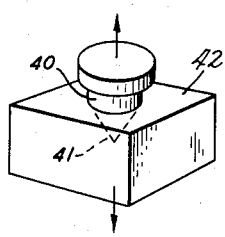
FIG. 8B
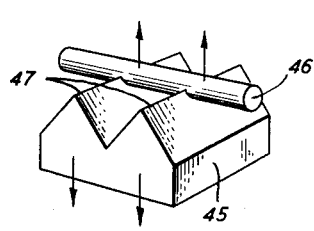
FIG. 9B
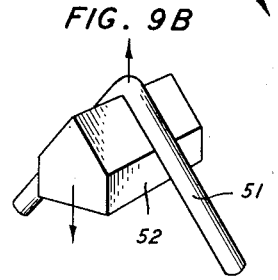
FIG. 10A
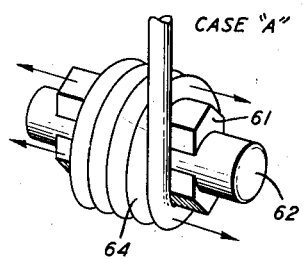
FIG. 10B
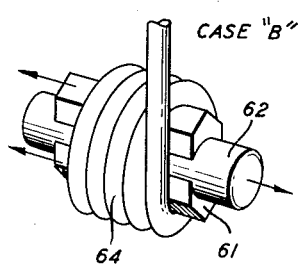
FIG. 10C
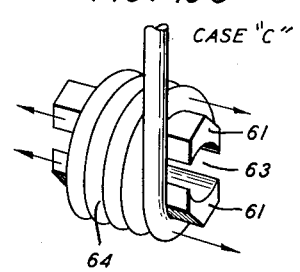
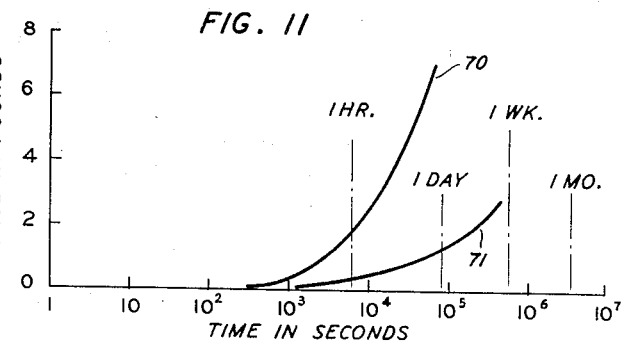
FIG. 11
INVENTOR
W. P. MASON
BY Hugh S. Wertz
ATTORNEY Jan. 20, 1959  W. P. MASON  2,870,241
METAL CONNECTION Filed Jan. 20, 1954  4 Sheets-Sheet 3

INVENTOR
W. P. MASON
BY
Hugh S. Wertz
ATTORNEY

Jan. 20, 1959 W. P. MASON 2,870,241
METAL CONNECTION
Filed Jan. 20, 1954 4 Sheets-Sheet 4

INVENTOR
W. P. MASON
BY
ATTORNEY

United States Patent Office 2,870,241
Patented Jan. 20, 1959

2,870,241

METAL CONNECTION

Warren P. Mason, West Orange, N. J., assignor to Bell Telephone Laboratories, Incorporated, New York, N. Y., a corporation of New York Application January 20, 1954, Serial No. 405,147

4 Claims. (Cl. 174—94)

This invention relates in general to joints of two or more metals, and more particularly to wrapped wire connections depending for their electrical and mechanical properties, principally upon certain physical and metallurgical relations developed in and by the elements of the connections themselves, rather than upon soldering or brazing or welding or other mechanical bonding of the elements of the connection by means of binders or binding means distinct from such elements.

The teachings of the present invention may be applied for the improvement of any of the types of connections known in the prior art in which continuous mechanical pressure is applied between the abutting or connecting elements. However, for the purpose of describing the invention, the discussion hereinafter will relate particularly to wrapped wire connections of the type disclosed in application Serial No. 294,607 filed by R. F. Mallina on June 20, 1952, and now matured into Patent No. 2,759,166, granted August 14, 1956. The wrapped wire connection disclosed by Mallina comprises a metallic terminal, electrical or otherwise, including at least two longitudinal surfaces which meet at an abrupt edge, and about which a plurality of turns of a filamentary metallic member or wire conductor are wound under such conditions that well-defined contact areas are formed between the turns of conductor and the terminal edge. These contact areas include mating depressions in both conductor and terminal edge caused by plastic deformation of the materials during the winding operation. The contact areas of wire and terminal exert upon each other an average compressional stress high enough to insure that these contact areas will remain pressed together under high compressive force for a considerable period of time in a metallically-clean, intimate, gas-tight contact area. Photoelastic and stress studies show that a connection of the aforesaid type is initially held together by the "hoop" stress in the wire which enters the joint as the result of the tension put on the wire by the wrapping tool.

In the course of aging under varying environmental conditions, the tension initially imposed on the wrapping wire is gradually relaxed, a factor which would normally operate to reduce the pressure between the contacting surfaces, and in time loosen the connection to the degree that it might fail to give satisfactory electrical or mechanical performance.

Accordingly, it is the principal object of the present invention to realize a metal-to-metal connection which maintains and even increases its mechanical stability and electrical conductivity with time, notwithstanding factors that ordinarily tend to relax the contacting pressures initially imposed on such connection. A more specific object of the invention is to determine preferred forms and combinations of materials to be utilized in wrapped wire connections of the type disclosed in the Mallina patent, which forms and combinations operate to compensate for a gradual loosening of the wrapping coil on the terminal due to aging.

It has been found in accordance with the present invention that when a wrapped-wire connection of the type described in the cited application of Mallina is subjected to aging tests under various conditions, a series of stresses is generated by the solid-state diffusion of the metallic elements of the connection into one another at the areas of contact. This phenomenon operates to eventually eliminate the surface between the wire and the terminal and, in effect, join the two together, hence, compensating in degree for the usual relaxation in pressure between the contacting surfaces and gradual loosening of the connection which would otherwise occur over a period of time.

The present invention contemplates the construction of a metal-to-metal joint wherein solid-state diffusion is promoted between the contacting surfaces, to such an extent that it ultimately contributes a major part of the forces holding the joint together. This is carried out by the choice of the component materials of the junction in accordance with certain definite criteria, which will be set forth hereinafter.

One criterion relates to the "activation energy" of the materials of the connection, which is a measure of the energy required to change the position of a molecule from a given position to the next stable position in the crystal lattice. Combinations of materials suitable for the purposes of the present invention are characterized by activation energies at zero stress of less than 40 kilocalories per mole for the most mobile material.

Another criterion relates to the limiting shearing stress of the diffusible material which may be defined as the minimum applied force required to produce shearing deformation therein. This should approximate or exceed 5,000 pounds per square inch, for the diffusion agent selected.

Materials which meet these qualifications when used in combination with conventional electrical circuit components, such as for example, copper conductors and brass or nickel-silver terminal elements, are zinc, aluminum and cadmium or combinations of the same.

In application of the present invention to wrapped-wire connections of the form disclosed in the cited application of Mallina, a desired degree of diffusion is promoted by interposing between wrapping wire and terminal, in intimate relation with the mutual contact areas, a material chosen in accordance with the foregoing criteria. In preferred embodiment, this may take the form of a thin film of zinc, aluminum, or cadmium which may be applied as a coating of from $\frac{1}{50}$ to 2 mils thick, to either the wrapping wire or the terminal, the former comprising, for example, copper, and the latter, brass, or nickel-silver.

A particular feature of joints fabricated in accordance with the present invention is that they are subject to a satisfactory long-life contacting force which tends to strengthen with age.

Other objects, features, and advantages of the present invention will be understood from the more detailed description hereinafter in connection with the various figures of the drawings forming a part of the present disclosure, the drawings being described generally as follows.

Figure 12:
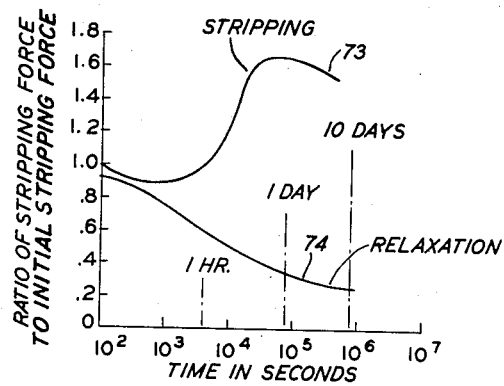
Figure 13:
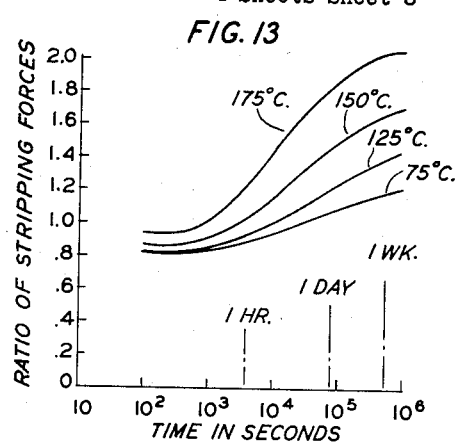
Figure 14:
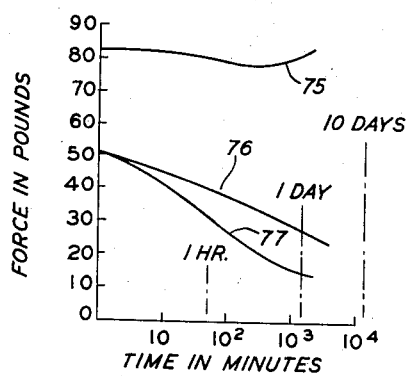
Figure 15:
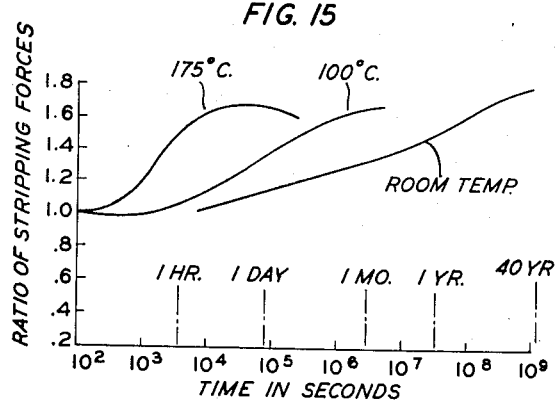
Figure 16:
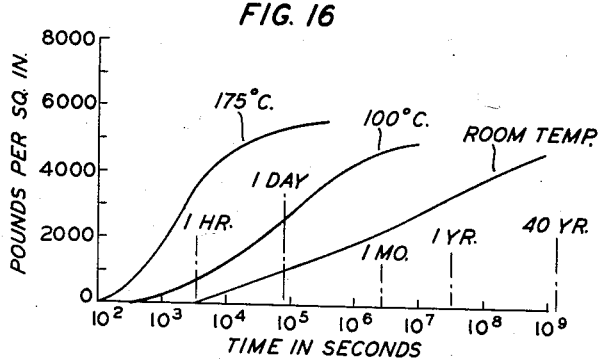
Figure 17:
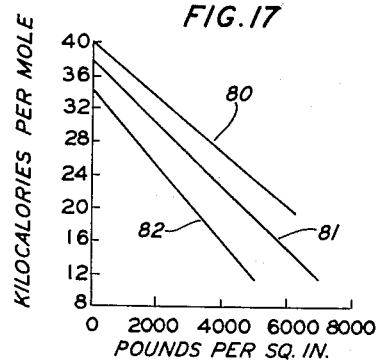
Figure 18:
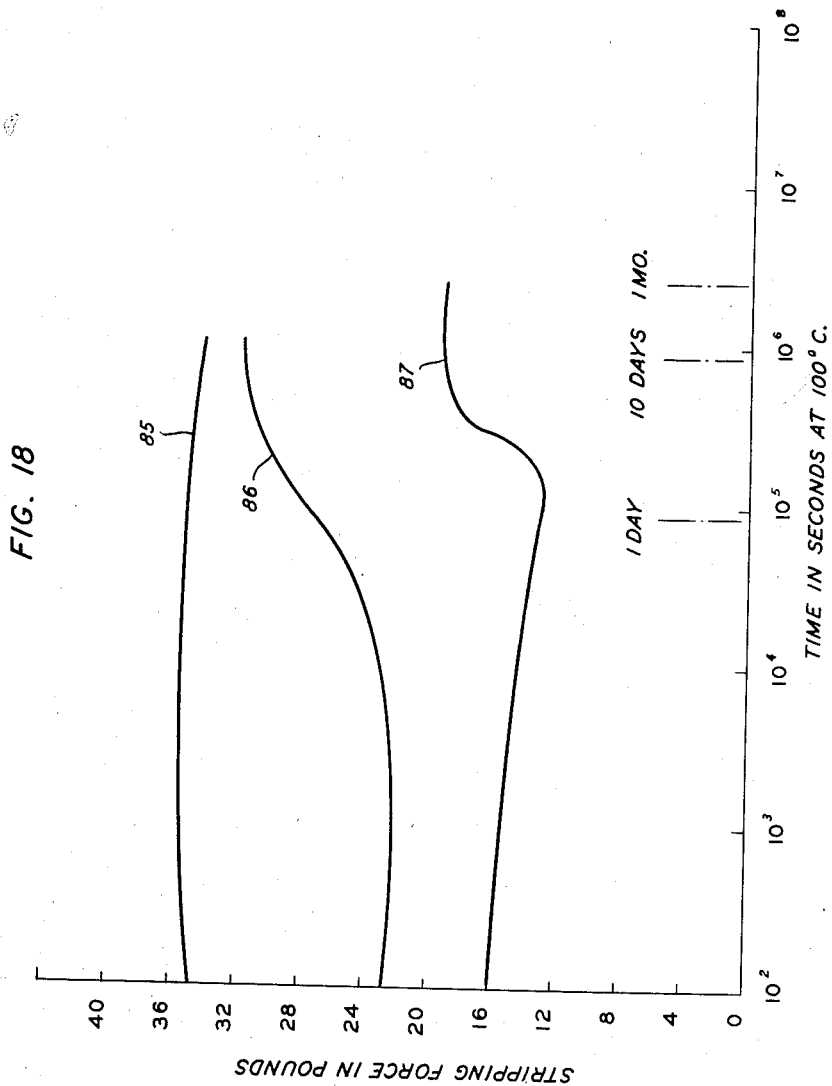

Figs. 7A and 7B indicate experimental apparatus for determining the tendency of elements to remain together under pressure;

Figs. 8A and 8B indicate experimental apparatus for measuring diffusion forces between a contacting wire and a double-toothed knife edge;

Figs. 9A and 9B indicate apparatus for measuring diffusion forces generated when a wire is stretched over a sharp corner of a supporting block;

Figs. 10A, 10B and 10C indicate apparatus for measuring stripping, frictional and fusion forces between a wrapped connection and the supporting terminal;

Fig. 11 shows diffusion force plotted as a function of time for a zinc wire on a nickel-silver base at 175° C. and at 100° C.;

Fig. 12 shows stripping force plotted as a function of time for a solderless wrapped connection comprising bare copper wire winding on brass terminals at 175° C.; and also stress-relaxation as a function of time for the aforesaid copper winding;

Fig. 13 shows the stripping force plotted as a function of time for a solderless wrapped connection comprising an aluminum wire winding on a nickel-silver terminal at 175° C., 150° C., 125° C., and 75° C.;

Fig. 14 shows the difference between stripping force and frictional force due to hoop stress plotted as a function of time for a solderless wrapped connection comprising a tin-coated copper wire winding on a nickel-silver terminal at a temperature of 175° C.;

Fig. 15 shows the ratio of measured stripping force to initial stripping force plotted as a function of time for a solderless wrapped connection comprising a bare copper wire winding on a zinc-plated brass terminal at 175° C., 100° C., and room temperature;

Fig. 16 shows the shear strength plotted as a function of time for a solderless wrapped connection comprising a copper wire winding on a zinc-plated brass terminal at 175° C., 100° C., and room temperature;

Fig. 17 shows the activation energy plotted as a function of hoop stress for a solderless wrapped connection comprising a tin-plated copper wire winding on a nickel-silver terminal, a bare copper wire winding on a zinc-plated brass terminal, and an aluminum wire winding on a nickel-silver terminal; and Fig. 18 shows the stripping force plotted as a function of time for wrapped wire connections comprising tinned copper wire on a zinc-plated nickel-silver terminal, bare copper wire on a zinc-plated nickel-silver terminal and tinned copper wire on a nickel-silver terminal.

As stated earlier in the specification, the present invention may be applied with great advantage to a wrapped wire connection of the form disclosed in the R. F. Mallina patent. An enlarged view of such a connection is shown in Fig. 1 of the drawings.

Figure 1:
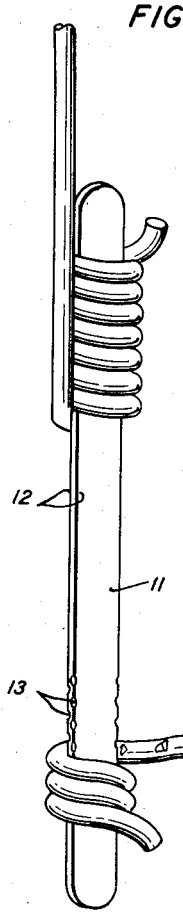
Fig. 1 illustrates two wrapped-wire connections of the type disclosed in the Mallina patent, one of which is partially unwound.
Figure 2:
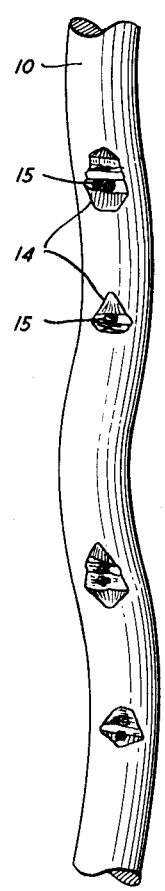
Fig. 2 is a magnified showing of an unwound portion of wire from one of the connections of Fig. 1.

Referring in detail to Fig. 1, several turns of a solid, but not necessarily homogeneous, conducting wire 10, which extends from an insulated conductor, not shown, is wound on a longitudinal terminal element 11. The latter is preferably characterized by at least one pair of surfaces forming a dihedral angle of 150° or less, the abrupt edges 12 so formed extending the length of the terminal. The turns of wire 10 are mechanically locked about the terminal 11 under longitudinal tension. When this connection is made, the abrupt edge 12 of the terminal 11 cuts into the turns of wire 10, and the latter, in turn, shears the edge 12 of the terminal 11 at a number of points. One result, among other effects to be discussed hereinafter, is that flattened areas 13 are produced on the terminal edge 11, which mate with similar notched or scraped depressions 14 on the turns of the wrapping wire 10. All of these details are discussed with particularity in the cited patent to Mallina.

Figure 3:
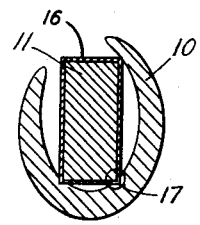
Fig. 3 is a cross-sectional view of a wrapped connection such as shown in Fig. 1 wherein the rectangular terminal element is plated with a metal selected in accordance with the teachings of the present invention.
Figure 4:
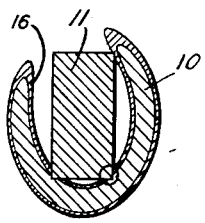
Fig. 4 is an alternative showing of a cross-section of an embodiment of Fig. 1 in which the winding wire is coated in accordance with the teachings of the present invention.

In accordance with a preferred embodiment of the present invention, either the wire 10 or the terminal 11 is coated, as indicated in the cross-sectional showing of Figs. 3 and 4, respectively, with a plating 16 approximating between a half mil and five mils in thickness, which meets certain specific conditions as to activation energy in combination with the other materials of the junction, and limiting shearing stress, such as will be discussed in detail hereinafter.

As explained in detail in the cited patent to Mallina, the wire 10 is wrapped around the cross-sectional periphery of the terminal 11 in such a manner that high tensile stress is locked into a majority of the longitudinal fibers of the wire 10.

While there may be many means devised for making such a wrapped connection, it is considered best to employ some sort of tool whereby a degree of control may be exercised over the making thereof. Patent 2,585,001, of February 12, 1952 to C. N. Hickman, R. F. Mallina and F. Reck, discloses one type of tool involving tool principles which may be used to make connections according to the present invention. There may well be other tools or apparatus which could be employed for such purposes.

When the wire 10 is bent around the edge 12, thereby crushing and shearing the same to form the flattened area 13, and at the same time, creating notches or depressions 14 in the wire 10, a particularly intimate gas-tight current-carrying mechanical and electrical contact is formed between the terminal element 11 and the wire 10. Due to the shearing action between the surfaces, there is little chance, if any, for oxidation. Moreover, under the tension uniting the flattened areas 13 and the depressions 14 in the wire 10, portions of the plating metal are scraped aside, forming little islands 15 in the contact areas.

Assuming that the terminal element 11 and the wrapping wire 10 are held in the aforesaid intimate gas-tight contact for an extended period, solid-state diffusion gradually takes place between the plating material and the adjacent contacting elements. That is, molecules of the coating material move out into the bodies of the other contacting metals. The degree to which such solid-state diffusion occurs depends on the length of the period over which the elements are maintained in intimate, gas-tight contact, the temperature conditions at the contact, the pressure between the contacting surfaces, and certain inherent characteristics of the contacting metals, such as will be described in more detail hereinafter.

It has been found in accordance with the present invention that the use of certain plating metals and combinations of metals greatly contributes to the speed of the diffusion process, and the ultimate strength of the connection. Favored plating materials, such as aluminum, zinc, and cadmium, or alloys of the same, when utilized in combination with materials conventionally employed in electrical connections, such as copper conductors, on nickel-silver or brass terminals, meet the specifications set forth hereinafter. In certain instances, use of bare wires or unplated terminals comprising one or more of the aforesaid materials may be found practicable.

It is understood that although the strengthening of metal connections by solid-state diffusion in accordance with the principles of the present invention is described in considerable detail with reference to wrapped connections of the form disclosed in the cited patent to Mallina, these principles are also applicable to embodiments of many diverse forms.

Figure 5:
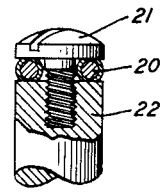
Fig. 5 shows an alternative embodiment in which a wire plated in accordance with the teachings of the present invention is featured in a conventional screw connection.

For example, Fig. 5 of the drawings illustrates a typical screw and nut connection, in which a wire 20 is compressed between a screw 21 and a nut member 22, the latter generally forming the terminal member of an electrical connection. In connections of this type, when the screw 21 is tightened, compressional force is applied to that portion of the wire held between the screw 21 and the nut member 22 which may be initially 8,000 pounds per square inch.

Assuming that the wire 20 is plated as described with reference to the wire 10 of Fig. 1, or otherwise meets certain conditions to be set forth in detail hereinafter, and that a gas-tight connection is maintained for an extended period, solid-state diffusion is established between the plating metal of the wire 20 and the adjacent portions of the screw 21 and nut member 22.

It will be apparent to those skilled in the art that the principles of the present invention can likewise be applied to numerous other conventional types of electrical and mechanical connections.

Figure 6:
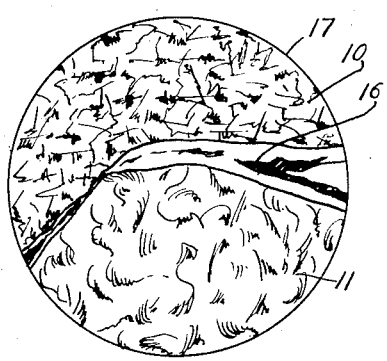
Fig. 6 is a microscopic view of the encircled area of Fig. 3 indicating solid-state diffusion between plating metal and the metal of the winding.

By photoelastic, photoplastic and strain analysis of wrapped wire connections of the type disclosed in the Mallina patent, it has been demonstrated that the wrapped wire connection is held together by the hoop stress in the outside wire whose value is determined by the winding stress and a locking-in effect dependent on a dissymmetry of the terminal. The present inventor has found that these high stresses cause plastic flow in the wire and terminal in such a manner that the two materials flow together and produce an intimate airtight joint. The intimate nature of this contact has been demonstrated by dip-coating nickel-silver terminals with pure tin and wrapping them with clean bare copper wire. The wrapped terminals were then placed in a glass tube, evacuated, sealed off, and heated for 400 hours to 180° C., which is 27° C. below the melting point of tin. The high temperature was used in this experiment to simulate a much longer period of aging at room temperature. The samples were then removed, mounted vertically, polished, etched, and examined microscopically for distinguishing constituents which might give indication that the contact was sufficiently intimate to permit solid-state diffusion. Fig. 6 of the drawings is such a microscopic view of a section of wire 10 in contact with a corner of the plated terminal 11 similar to the circled portion 17 of Fig. 3. The copper wire 10 is seen to have a heavy layer of tin constituent 16 at the contact surface, showing that solid-state diffusion of tin into copper has occurred in the wrapped solderless connection observed.

It will be apparent from a series of tests, about to be described, that the diffusion process will be greatly promoted by a critical selection of the diffusing agent according to certain criteria which will be set forth in detail.

The first of the series of experiments undertaken to determine the nature of the forces generated as the result of the diffusion process is indicated in Figs. 7A and 7B of the drawings. This consisted of pressing a conical shaped aluminum plug 40 into a depression 41, machined in an aluminum block 42, and maintaining this pressure for various times and temperatures. The pressure was varied up to 10,000 pounds per square inch, and the temperature was varied between 100° C. and 300° C. There was no tendency for the parts to remain together when the pressure was removed. Attempts to machine the contact surfaces sufficiently accurately so that they would adhere, met with no success. It was felt that the oxide layer which formed on the surface of the metals before the application of pressure, prevented the fusion from starting.

A second experiment, indicated in Figs. 8A and 8B, was initiated in which the aim was to create a fresh surface of contact between wire and terminal by the shearing action of a sharp knife edge. The terminal was represented by a double-toothed, sharp-edged block of aluminum 45 or nickel-silver, measuring ½ inch between the teeth, and ½ inch thick. A wire 46, .125 inch in diameter, alternatively of aluminum or copper, was pressed against the double-edge 47 of the double-toothed block under a constant pressure which was maintained for various times at various pressures. This caused extensive deformation and cold flow in the region of contact. The pressure was applied by a cantilever beam, the specimen being placed between the fulcrum and the weight on the end of the beam. Loads between 300 and 600 pounds were exerted on the wire 46 by this method.

This experiment gave positive results. After sufficient time had elapsed at a given temperature, a certain force was required to separate the wire from the block. It was noted, however, that the same force which produced the deformation originally must be continuously maintained to produce the diffusion. If the load was removed, at any time, it was noted that the wire 46 fell off the block 45, no force due to diffusion being detectable. This experiment indicates that diffusion occurs as the result of sustained intimate contact between a pair of metal surfaces under pressure.

In order to more closely simulate the stress relationships existing in wire wound connections of the type disclosed, another experiment was carried out as indicated in Figs. 9A and 9B. In this experiment, a wire 51 was pulled over a sharp corner of the block 52, as shown in Fig. 9A, and held under pressures, temperatures, and for times equivalent to preceding tests. In this test, the stress distribution was approximately the same as in the wire in the wrapped connection, but the deformation was not. In the wrapped connection, the wire is twisted and scraped over the sharp edge of the terminal, thereby scraping the oxide layer away from the surface. In this experiment the wire is pulled down equally on both sides of the terminal. The results of this test were negative. No forces due to diffusion were observed. This was attributed to the fact that the sharp edge of block 52 was not able to penetrate very deeply into the wire before the wire yielded elastically and broke. This test indicates that there is a minimum area of contact between the metal components, below which diffusion does not occur.

Another experiment was undertaken in which conditions existing in the wire wound connection were even more closely simulated than by the previous experiment. This is indicated in Figs. 10A, 10B and 10C.

In this experiment, a slotted terminal element was designed in which it was possible to realistically compare stripping, frictional, and fusion forces, so that all three forces could be measured independently but from the same sample. In this experiment, the stress in the neighborhood of the junction of the contacting surfaces is the same as found in an actual wrapped connection, such as indicated in Figs. 1–4. The terminal element 61, which is ½ inch long and ⅛ inch wide at the center, is slotted down its axis, and a pin 62 is inserted in the slot 63. As long as the pin 62 is in the slot 63, the cross-section of the terminal 61 has a uniform area. When the pin 62 is withdrawn from the slot 63, the ends of the terminal 61 can be pinched together with very little force. Under actual testing conditions, after the pin 62 was placed in the slot 63, the terminal 61 was then wound with 6 turns of .125 inch wire 64, and the assembly then placed in the oven and heated for various lengths of time. Several specimens were prepared and placed in the oven in one of two batches. In the first batch, the wire 64 is stripped off, while the pin 62 remains in the slot 63. This will be designated Case A. The force measured in this test is the stripping force. In the second batch, the pin 62 is pulled out of the slot 63 while the wire 64 remains on the terminal 61. This will be designated Case B. The force measured in this test is very nearly the frictional force which prevents the wire 64 from slipping off of the terminal 61. After the pins 62 have been pulled out of those terminals 61 in the second batch, the wires 64 are stripped off. This will be designated Case C. The force measured in this test is the diffusion force. In Case B, every attempt was made to make the coefficient of friction between the pin 62 and terminal 61 equal to that between the terminal 61 and the wire 64. Recalling that the frictional force is independent of area, and depends only on the normal force and the coefficient of friction, it is concluded that the force required to pull the pin should be about that required to strip the wire in the absence of diffusion. In Case C, the long slot 63 cut in the terminal 61, allows the ends of the terminal 61 to move towards each other with negligible force. Hence, in Case C the contribution of the frictional force is small, since this is proportional to the normal force. Therefore, most of the force required to pull the wire 64 off, after the pin 63 has been removed, is due to the forces set up by diffusion which has taken place between the wire 64 and terminal 61.

In all previous experiments, tests were run at temperatures between room temperature and 175° C.

In addition to the previously described experiments, the stripping forces were measured on standard terminals of the type described in Figs. 1–4. Several turns of wire 0.02 inch in diameter were wrapped on terminals 0.02 inch by 0.1 inch.

Fig. 11 shows curves in which force due to diffusion, resulting from the experimental procedures carried out with the apparatus of Figs. 8A and 8B, are plotted against time. The data plotted is for a zinc wire pressed against a double-toothed nickel-silver base, at two different temperatures, 175° C., curve 70, and 100° C., curve 71. The raised temperatures have the effect of accelerating the aging process.

This data shows the effect of diffusion under a pure compressive load. In these tests one observes a nucleation time, i. e., a time before which no diffusion forces are measured. After the nucleation time has passed, one sees a rather sharply rising curve. The nucleation time was found to depend on the size of the indentation in the wire and was proportional to the square of the indentation dimensions. This agrees with the idea that the diffusion starts at a given point and grows across the interface at a rate depending on the activation energy of diffusion under stress, and on the temperature. For materials with a low activation energy of diffusion, such as zinc, aluminum and cadmium, this nucleation time is small, while for other materials, such as copper or tin, it is larger.

Fig. 12 shows curves plotted from data derived using the experimental procedure indicated with reference to Figs. 10A, 10B, and 10C. This shows on the curve 73, the ratio of final stripping force to initial stripping force plotted as a function of time for a wrapped solderless connection comprising a bare copper wire winding on brass terminals. Curve 74 shows the stress relaxation of the aforesaid copper winding plotted as a function of time. In the absence of other effects, the ratio of the stripping forces indicated on curve 73 would be assumed to decrease at the same rate as the stress relaxation, plotted on curve 74. However, this experiment has indicated that the opposite occurs, inasmuch as the stripping force ratio, as indicated on curve 73, is seen to rise sharply after a few hours of accelerated aging at 175° C. This is due to the diffusion forces developed between the zinc and the copper during the accelerated aging process.

Further experiments in accordance with the present invention have indicated that the stripping force, in general, increases rather than decreases with time.

This is shown in Figs. 13, 14 and 15. The first of these, Fig. 13, shows the ratio of measured stripping force to initial stripping force as a function of time for a wrapped solderless connection comprising an aluminum winding on a nickel-silver terminal at 175° C., 150° C., 125° C., and 75° C., the raised temperatures merely operating to accelerate the conditions of aging, which occur more slowly at room temperatures.

Fig. 14 shows stripping force, represented by curve 75, and frictional force due to hoop stress, represented by curve 76, plotted against time for a tin-coated copper wire winding or a nickel-silver terminal at a temperature of 175° C. Curve 77 shows the relaxtion curve for a copper wire winding. These curves were plotted from data taken in accordance with the experimental procedures illustrated in Figs. 10A, 10B, and 10C. It is seen that the frictional force more closely follows the stress relaxation curve 77 for copper, while the stripping force, as shown in curve 75, increased after aging. The difference between the stripping force and the frictional force is accounted for, at least qualitatively, by the diffusion force.

Fig. 15 shows the ratio of measured stripping force to initial stripping force plotted as a function of time for a wrapped solderless connection comprising a bare copper wire winding on a zinc-plated brass terminal at 175° C., and room temperature. This increase of force cannot be ascribed to roughness or irregularities, which would tend to prevent the wire from being stripped off the terminal. The examination under the microscope showed that when aluminum wire was unwrapped from the terminal, the irregularities and depressions on the terminal in the region where the wire had been wrapped were not different in size or numbers from those depressions and irregularities which were in regions which had not touched the wire. This indicates that the increase in stripping force was not due to the shearing off of ridges on the edges of the terminals. Hence, it is apparent that the forces created by the diffusion process furnish the explanation for the increase of the stripping forces.

The results of the foregoing experiments lead to the conclusion that the difference between the measured stripping forces, and the frictional force (which decreases in value at the same rate that the stress relaxes out) gives the diffusion force.

The diffusion forces, calculated as described above, divided by the area of contact gives the shearing strength of the joint. These results are plotted in Fig. 16, which indicates the shearing strength of a copper wire winding on a zinc-plated brass terminal as a function of time, at 175° C., 100° C., and room temperature.

The previous results show that diffusion makes a better joint at higher temperatures. In order to evaluate the effectiveness of diffusion at room temperature, it is necessary to evaluate the activation energy of diffusion. This is done by calculating the value of H, activation energy, in the simple rate equation:

$$\tau = \tau_0 \exp(H/RT)$$

where $\tau$ = measured time for a given diffusion force
$\tau_0$ = a constant
$R$ = thermal energy per degree C. for one mole of material = 2 calories
$T$ = absolute temperature.

In the above equations, a given change of temperature corresponds to a given change of time on the diffusion force curves, as shown in Fig. 16.

The activation energies of diffusion for a tin-plated copper wire winding on a nickel-silver terminal (curve 80), for a bare copper wire winding on a zinc-plated brass terminal (curve 81), and for an aluminum wire winding on a nickel-silver terminal (curve 82) are plotted as functions of hoop stress in Fig. 17. It will be noted that the activation energies decrease with increasing stress, the combinations including zinc and aluminum being substantially lower than the combination containing tin.

Moreover, Fig. 18 of the drawings shows the effect of different plating on the stripping force of solderless wrapped connections, plotted as a function of time at 100° C., curve 85 indicating tinned copper wire on a zinc-plated nickel-silver terminal, curve 86 indicating bare copper wire on a zinc-plated nickel-silver terminal, and curve 87 indicating tinned copper wire on a nickel-silver terminal. It is seen that the combination of tinned copper wire on a zinc-plated terminal gives a substantially uniform performance for a long period, and has an appreciably higher stripping force than the other combinations. This indicates that the activation energy for copper into tin is so low that complete diffusion takes place in a very short time and the material is practically cold welded.

The experiments outlined in the foregoing pages give ample evidence of the existence of diffusion in the wrapped wire connections. The results obtained at high temperatures maintained for short times account for the fact that the stripping force at room temperature does not decrease with extended aging of the terminal although the hoop stress in the wire relaxes to lower values.

Further tests have shown that the average strength of fifty wrapped connections of the types disclosed in Figs. 1–4, comprising tin-plated copper wire wound on nickel-silver terminals, was 5760 grams immediately after wrapping at room temperature. Ten of these wrapped connections were stripped after they had been held for 1.75 years at 85° F. in a 90 percent relative humidity atmosphere. The average stripping force of this batch was 5718 grams. If the stripping force had been entirely due to friction, according to stress relaxation measurements, it should have dropped to 70 percent of its original value in 1.75 years, or to a value of 4030 grams. These tests indicate that at room temperature forces due to diffusion had accounted for 1688 grams.

In a joint utilizing plating materials such as aluminum, zinc, and cadmium, which are characterized by activation energies considerably less than that of tin, as indicated in Fig. 17, and Fig. 18, and limiting shearing stresses considerably greater than that of the latter, it is apparent that much larger forces due to diffusion, would develop over the same period.

The results of the foregoing tests can be summarized as teaching the following conditions for promoting solid-state diffusion in metal-to-metal connections to a sufficient extent to generate forces contributing a major part of the ultimate strength of such connection:

(1) The metal components of the connection are characterized by an activation energy at zero stress which is less than 40 kilocalories per mole.

(2) The principal diffusing agent is further characterized by a limiting shearing stress approximating 5,000 pounds per square inch or greater.

(3) All of the metal components of the connection are preferably characterized by elastic moduli of 30,000 pounds per square inch or greater.

(4) A fresh surface is created preferably between the contacting metals of the connection by shearing off the oxide layer on the surface in the region of contact. The rate of diffusion is a function of the contact area.

(5) Under usual operating conditions of temperature and humidity, the contacting surfaces should be held together in intimate sustained gas-tight connection with a pressure averaging at least 6000 pounds per square inch for a period approximating a year or more.

In addition to the above-outlined general conditions for connections relying on the forces of diffusion to provide mechanical and/or electrical stability, certain additional conditions apply specifically to those embodiments of the invention comprising wrapped wire connections of the form disclosed in Figs. 1–4, in which either the wire or the terminals have been coated with a thin film of aluminum, zinc, or cadmium. These conditions are as follows:

(6) A plurality of turns of wire should be included in the wrap.

(7) The wrap structure should be of such form that potential energy is stored as stresses in the wire and in the terminal, such that elastic recovery of the wire or both the wire and the terminal, depending on the relative stiffness, can counteract losses in contact area pressure, such as may be caused by internal conditions tending to gradually relax the connections.

(8) In acceptable wire wound connection of the type disclosed in Figs. 1–4, the contact area is at least about 25 percent or greater than the cross-sectional area of the wire, the preferred connections have an aggregate of 100 percent or greater, and an ideal connection has an aggregate greater than the wire area. This limitation is of particular significance in dealing with the invention embodied in electrical wrapped connections, in which the contact area of the connection has a direct bearing on the electrical resistance or impedance thereof.

(9) The average contact pressure per contact area is preferably not less than about 75 percent of the yield stress of that material of the wire or terminal which has the lower yield stress. This lower limit for such average pressure will insure a minimum acceptable tightness of connection.

(10) The material of the more preferred terminal is one which has a shearing modulus of about $10^5$ pounds per square inch or larger. This limitation imposed upon preferred terminal material will withstand the shearing and crushing forces exerted upon it in the completed connection.

(11) While basically the only requirement in the shape of the terminal is that it contain at least two longitudinal surfaces not necessarily straight or flat which meet at an abrupt edge, the most preferred types of terminals are those whose longitudinal sides are substantially parallel and straight and whose cross-sections are sharp-edged polygons. This condition should be met in order for the wire turns to be insured of at least locking themselves onto the terminals. The only necessary characteristic of such an abrupt edge is that of having an appreciable penetrating power relative to the wire.

(12) In suitable connections the hoop stress (that tension remaining in the wire turns in the completed connection per se) should be about 30 percent or greater of the tensile breaking force of the wire. The most suitable connections will be those whose hoop stress does not exceed about 75 percent of the tensile breaking force of the wire. Sufficient wrapping tension (that is tensile stresses or other stress such as bending stress applied to the wire during the wrapping of a preferred connection) is employed to insure these ranges of wrapped tension after relaxation takes place when the wrapping tension or other wrapping stress is removed.

The foregoing lengthy but concise statement of the invention and its various degrees of scope is a summary of engineering considerations which may enter the determinations of a metal-to-metal connection, in accordance with the present invention, and more specifically, a wrapped wire connection of the form specifically disclosed as an illustrative embodiment of the present invention. The foregoing factors may be considered in fabricating such a connection, and may be considered, therefore, as criteria for fixing the character and method of its manufacture. Moreover, a joint or connection can be analyzed in accordance with the foregoing considerations to ascertain whether or not it satisfies conditions of structure set forth.

While the invention has been described hereinbefore with general reference to electrical connections, the use of the term "electrical" is merely indicative of the most likely and preferred field of utility for the invention; and connections falling within the spirit of the present invention are in no way to be considered as limited in the scope or intended field of utility to electrical connections.

Furthermore, although one of the greatest advantages afforded by the present invention lies in the fact that an electrical connection need not be soldered or welded, etc., in order to stabilize the mechanical and electrical properties thereof over a considerable period of time in use, that fact is in no way to be considered as inferring that the invention is so limited.

What is claimed is:

1. A wrapped electrical connection comprising in combination a pair of terminal elements, one said terminal element comprising at least two longitudinal surfaces which meet at an abrupt edge, the second of said terminal elements comprising a tight coil of wire surrounding said one terminal element in a plurality of turns, and contact areas between said turns and said one terminal edge comprising sheared, mating depressions in both said one terminal edge and in said turns, means for maintaining the majority of the fibers of said turns under high tension to produce a sustained contacting pressure of between five and ten thousand pounds per square inch between said turns and said one terminal edge at said contact areas for a period of at least a month, a thin layer of metal of between two hundredths of a mil and two mils thick interposed intimately between said one terminal edge and said turns at said contact areas, said layer characterized by an activation energy into at least one of said terminal elements which is less than 40 kilocalories per mole, and a limiting shearing stress approximating at least five thousand pounds per square inch.

2. A wrapped connection in accordance with claim 1 in which said thin layer is a metal selected from the group consisting of aluminum, zinc and cadmium.

3. A wrapped connection in accordance with claim 1 in which said thin layer of metal takes the form of a substantially uniform coating of between two thousandths of a mil and two mils thick on the wire of said coil.

4. A wrapped connection in accordance with claim 1 in which said layer of metal takes the form of a substantially uniform coating of between two thousandths of a mil and two mils thick on the first said terminal element.

References Cited in the file of this patent

UNITED STATES PATENTS

| | | |
|---|---|---|
| 2,039,462 | Stonecipher | May 5, 1936 |
| 2,522,408 | Sowter | Sept. 12, 1950 |
| 2,759,166 | Mallina | Aug. 14, 1956 |

FOREIGN PATENTS

| | | |
|---|---|---|
| 478,726 | Canada | Nov. 20, 1951 |

OTHER REFERENCES

Publication I, "The Welding Journal," December 1950, reprint of article entitled, "Latest Developments in Kold-welding," pp. 1–5, in Div. 13.

Publication II, "Fortune," September 1950, reprint of article entitled, "Cold Welding," in Div. 13.

Publication III, "Modern Metals," December 1952, reprint of article entitled, "Technical Factors in Cold Welding Aluminum," in Div. 13.